United States Patent [19]

Ordo

[11] Patent Number: 4,640,294
[45] Date of Patent: Feb. 3, 1987

[54] ASSEMBLY METHOD AND APPARATUS FOR SPLINE-TYPE CONNECTION

[75] Inventor: Richard A. Ordo, Greenwood, Ind.

[73] Assignee: General Motors Corporation, Detroit, Mich.

[21] Appl. No.: 707,391

[22] Filed: Mar. 1, 1985

[51] Int. Cl.$^4$ .................. F16D 13/52; F16D 13/68; B25B 27/14

[52] U.S. Cl. .................. 192/70.2; 29/274; 29/281.5; 29/464; 192/87.11

[58] Field of Search .............. 192/70.11, 70.16, 70.19, 192/70.2, 110 S, 87.11; 29/464, 467, 468, 281.5, 274; 403/1, 13, 14

[56] References Cited

U.S. PATENT DOCUMENTS

| | | | |
|---|---|---|---|
| 3,670,391 | 6/1972 | Cahill | 29/273 |
| 3,685,126 | 8/1972 | Kane | 29/254 |
| 3,686,739 | 8/1972 | Manero | 29/274 |
| 3,747,727 | 7/1973 | Dach et al. | 192/87.11 X |
| 3,992,117 | 11/1976 | Ristau | 403/14 |
| 4,231,147 | 11/1980 | Witt | 29/433 |
| 4,254,542 | 3/1981 | Craig | 29/464 |
| 4,297,781 | 11/1981 | Hennenfent et al. | 29/467 |
| 4,433,767 | 2/1984 | Thor | 192/67 P |
| 4,433,934 | 2/1984 | Cleveland | 403/325 X |
| 4,492,292 | 1/1985 | Thor | 192/67 R |
| 4,545,471 | 10/1985 | Danelson et al. | 192/67 R |
| 4,560,300 | 12/1985 | Vollmer et al. | 403/325 X |
| 4,564,994 | 1/1986 | Marx | 29/281.5 X |

FOREIGN PATENT DOCUMENTS 485518 5/1938 United Kingdom .................. 29/274

Primary Examiner—Rodney H. Bonck
Attorney, Agent, or Firm—Saul Schwartz

[57] ABSTRACT

Method and apparatus for assembling a spline-type connection wherein a plurality of angularly spaced spline teeth on a first member project radially from a circular edge thereof and are disposed in an imaginary annulus concentric with the circular edge, a staging annulus corresponding in size to the imaginary annulus is formed on a second member at one end of and perpendicular to a cylindrical wall on the second member adapted to slidably receive the circular edge of the first member, a frusto-conical centering guide shoulder is formed on the second member around the staging annulus and extends longitudinally outboard from the staging annulus, and a plurality of spline grooves are formed in the cylindrical wall and intersect the staging annulus at a corresponding plurality of notches angularly spaced to register with the spline teeth. During assembly, the first member is advanced to a staged position on the second member wherein the spline teeth rest on the staging annulus and is then rotated in the staged position to register the spline teeth with the notches to permit advancement of the spline teeth along the spline grooves.

11 Claims, 7 Drawing Figures

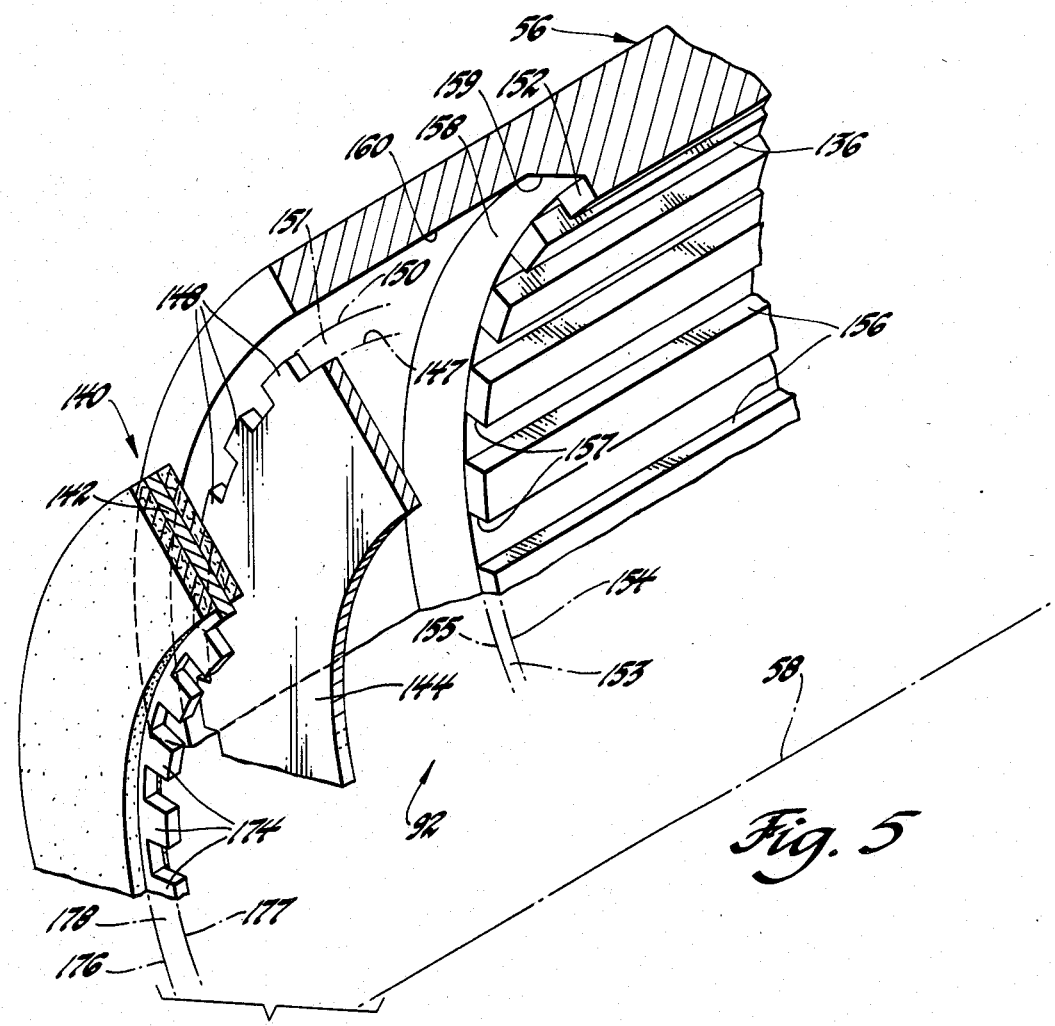
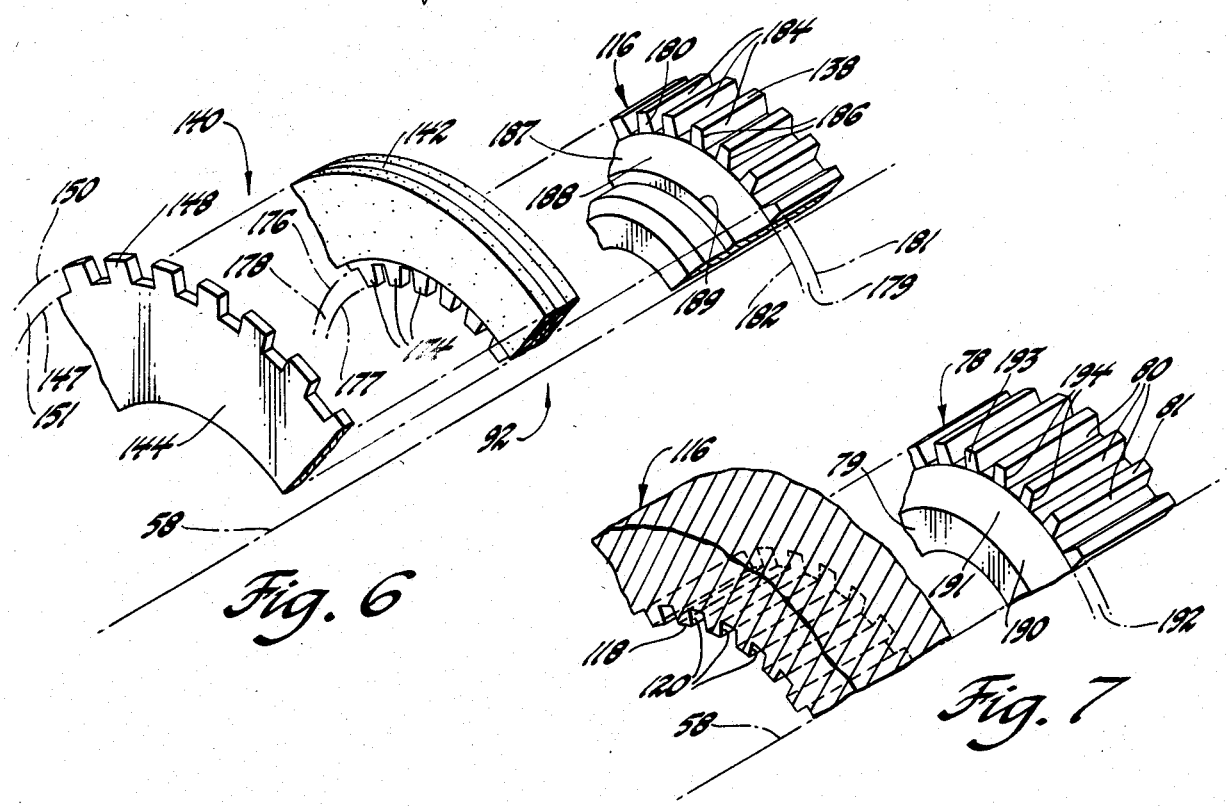
Fig. 5
Fig. 6
Fig. 7

ASSEMBLY METHOD AND APPARATUS FOR SPLINE-TYPE CONNECTION

FIELD OF THE INVENTION

This invention relates generally to methods of and apparatus for assembling spline-type connections and, more particularly, to methods of and apparatus for assembling stationary and rotating clutches of automotive automatic transmissions.

DESCRIPTION OF THE PRIOR ART

Automatic transmissions for automotive vehicles typically include rotating and stationary clutches wherein annular clutch plates of clutch packs between relatively rotatable, concentric cylindrical walls are alternately spline connected at outside diameters to the radially outer cylindrical walls and at inside diameters to the radially inner cylindrical walls so that when the clutch packs are compressed by clutch pistons the inner and outer cylindrical walls are rigidly interconnected. In the assembly of such clutches, either initially or after disassembly and repair, all the plates of the clutch pack are first individually assembled on a clutch member defining one of the inner and outer concentric walls and then another clutch member defining the other of the walls is assembled onto the clutch pack. With respect to the initial step of individual assembly of the clutch plates on the one of the inner and outer walls, the ones of the clutch plates being spline connected thereto must be positioned perpendicular to the longitudinal axis of the wall and in angular registry with the spline grooves therein before they can be advanced along the grooves. Because the clutch plates are not easily positioned and held perpendicular to the axis of the appropriate one of the inner or outer walls, they are difficult to assemble with the efficiency required for mass production. With respect to the succeeding step of assembling the clutch member defining the other of the inner and outer walls, even more difficulty is encountered because the spline teeth which engage therewith are in neither angular registry nor axial alignment with each other and are usually shrouded or concealed by the clutch member being installed. Accordingly, assemblers may shake or vibrate the components as they attempt to progressively assemble the clutch member defining the other of the concentric walls around or into the clutch pack, a procedure also not well suited to efficient mass production. Proposals for simplifying the second step have included use of assembly fixtures to prealign the plates which are then clamped together while the fixture is removed and replaced by the appropriate clutch component. These proposals are not attractive because of the extra steps required and because they still require considerable skill on the part of the assembler. With the assembly method and apparatus according to this invention, the spline-toothed and spline-grooved members are automatically located in a staged position or relationship wherein only relative angular rotation is necessary to register the teeth and grooves for completion of the assembly procedure.

SUMMARY OF THE INVENTION

Accordingly, the primary feature of this invention is that it provides a new and improved method of and apparatus for assembling relatively flat spline-toothed members, such as clutch plates, on relatively elongated spline-grooved members such as clutch drums, clutch hubs, and transmission housings. Another feature of this invention is that it provides a new and improved method and apparatus whereby devices such as clutches, having packs of annular plates spline connected to concentric inner and outer cylindrical walls, are adapted for automated assembly by robots without complex and expensive machine vision techniques. Yet another feature of this invention resides in the provision in the new and improved method and apparatus of a centering guide or concentricity chamfer on the elongated member operative to guide the flat member to a staged position on a staging annulus on the elongated member wherein the flat member is perpendicular to a longitudinal axis of the elongated member and concentric with a spline grooved wall thereof so that only angular rotation of the flat member to achieve registry between spline teeth thereon and the spline grooves is required for advancement of the flat member relative to the elongated member. Other features of this invention reside in the provision, in alternate embodiments of the new and improved method and apparatus according to this invention, of inner and outer centering guides which guide the flat members to staged positions. And a still further feature of this invention resides in the provision, in another embodiment of the new and improved method and apparatus according to this invention, of an outer centering guide on an end of an externally spline grooved shaft whereby a hub having an internally spline grooved bore therein is guided to a staged position on a staging annulus on the shaft wherefrom only angular rotation of the hub relative to the shaft is required to register the internal and external spline grooves for advancement of the hub along the shaft.

These and other features of this invention will be readily apparent from the following specification and from the drawings wherein:

FIG. 5 is an enlarged, fragmentary perspective view of a portion of FIG. 4 taken generally along the plane indicated by lines 5—5 in FIG. 4;

FIG. 6 is an enlarged, fragmentary perspective view of a portion of FIG. 4 taken generally along the plane indicated by lines 6—6 in FIG. 4; and FIG. 7 is an enlarged, fragmentary perspective view taken generally along the plane indicated by lines 7—7 in FIG. 4.

Figure 1:
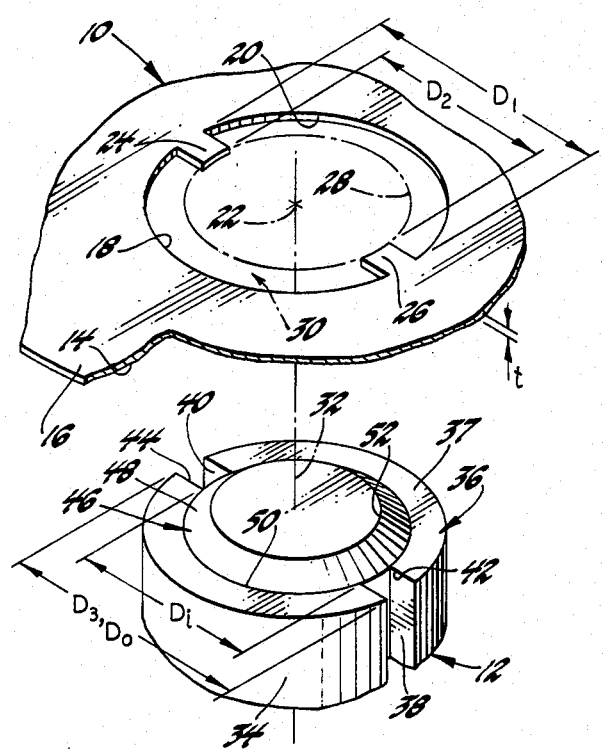
FIG. 1 is a schematic perspective view of a generic embodiment of the assembly method and apparatus according to this invention.

Referring now to the drawings, FIG. 1 is a generic representation of the assembly method and apparatus according to this invention whereby a relatively flat member 10, hereinafter referred to as plate 10, is assembled on a relatively elongated member 12, hereinafter referred to as hub 12. The plate 10 has a lower surface 14, an outer peripheral edge 16 of any convenient shape, and a circular opening or aperture 18 bounded by a circular edge 20 of the plate. The circular edge 20 is centered about an imaginary center 22 in the plane of the plate and has a diameter $D_1$. A pair of internal spline teeth 24 and 26 are symmetrically angularly spaced around and project radially inward from the circular edge 20 and are representative of any number of spline teeth which may be arrayed around the edge. The teeth 24 and 26 project radially inward to an imaginary circle 28 of diameter $D_2$ concentric with the circular edge 20 so that the teeth 24 and 26 are disposed in an imaginary annulus 30 the radial depth of which corresponds to one half of the difference between the diameters $D_1$ and $D_2$.

With continued reference to FIG. 1, the hub 12 has a longitudinal axis 32 around which is formed an outside cylindrical wall 34 having a diameter $D_3$ substantially equal to the diameter $D_1$ of the opening 18 in the plate 10. A shoulder or staging annulus 36 is defined by a shoulder 37 formed on an end of the hub 12 in a plane perpendicular to the axis 32 and is bounded by an outside diameter $D_o$ coincident with the edge of the outside cylindrical wall 34 and an inside diameter $D_i$ generally equal to the diameter $D_2$ of the imaginary circle 28. The staging annulus 36 thus corresponds in size to the imaginary annulus 30. A pair of representative spline grooves 38 and 40 in the outside cylindrical wall 34 of the hub 12 have cross sectional configurations corresponding to the shape of the spline teeth 24 and 26 and intersect the staging annulus 36 at a pair of notches 42 and 44, respectively, in the latter. The notches 42 and 44 are angularly spaced around the staging annulus to register with the spline teeth 24 and 26. The hub 12 also has formed thereon an outside centering guide or concentricity chamfer 46 in the form of a frusto-conical shoulder 48 centered on the axis 32 and bounded by an outer circular edge 50 coincident with the inside diameter $D_i$ of the staging annulus and an inner circular edge 52 longitudinally outboard of the staging annulus. The diameter of the inner circular edge 52 is smaller than the diameter $D_2$ of the imaginary circle 28.

The assembly method and apparatus according to this invention significantly simplifies assembly of the plate 10 on the hub 12, or vice versa, regardless of the thinness of the plate and closeness of the clearances between the circular edge 20 and the outside wall 34 and between the spline teeth 24 and 26 and the spline grooves 38 and 40. More particularly, in a preferred assembly sequence the hub 12 is held stationary by a fixture, not shown, and the plate 10 is positioned over the hub with opening 18 nominally centered on the axis 32. The plate is then advanced to a staged position, not shown, relative to the hub 12 wherein the centering guide 46 projects through the opening 18 and the spline teeth 24 and 26 rest on or abut the staging annulus 36. During movement of the plate to the staged position the centering guide 46 functions as a reaction member causing the plate 10 to translate perpendicular to the axis 32 concurrent with axial advancement such that in the staged position the circular edge 20 on the plate is substantially precisely concentric with the outside cylindrical wall 34 on the hub. In addition, because the plane of the staging annulus 36 is perpendicular to the axis 32 and because the spline teeth 24 and 26 are symmetrically arrayed around the edge 20, the plate 10 automatically assumes a stable position on the staging annulus perpendicular to the axis 32. Assembly is then completed by simple rotation of the plate 10 about the axis 32 until the spline teeth 24 and 26 register with the notches 42 and 44, whereupon the plate is advanced over the hub as the spline teeth traverse the spline grooves 38 and 40. It is understood, of course, that while only two spline teeth and two spline grooves are illustrated, any number may be employed. Similarly, while the plate 10 is advanced, translated and rotated relative to the hub 12 in the assembly sequence described, these functional roles might be fully or partially reversed.

Figure 2:
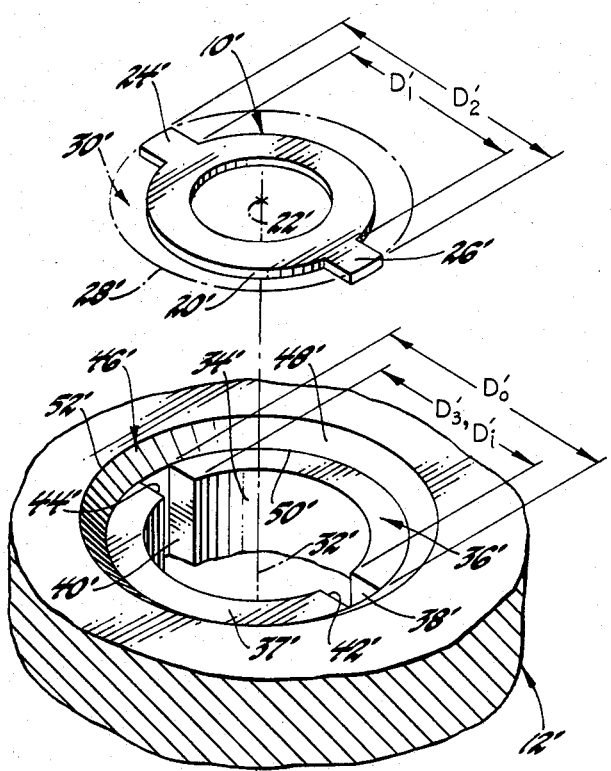
FIG. 2 is similar to FIG. 1 but showing a modification of the generic embodiment of the assembly method and apparatus according to this invention.

FIG. 2 illustrates a modification of the generic embodiment of the assembly method and apparatus according to this invention wherein features corresponding to features of the generic embodiment illustrated in FIG. 1 are identified by corresponding primed reference characters. Referring to FIG. 2, a plate 10' has an outside circular edge 20' of diameter $D_1'$ centered about a center point 22' on the plate. A pair of external spline teeth 24' and 26' in the plane of the plate 10' are symmetrically angularly spaced around and project radially outward from the circular edge 20' to a concentric imaginary circle 28' having a diameter $D_2'$. Accordingly, the teeth 24' and 26' are disposed in an imaginary annulus 30' the radial depth of which corresponds to one half of the difference between the diameters $D_1'$ and $D_2'$.

With continued reference to FIG. 2, a housing 12' corresponding to the hub 12 of the embodiment of FIG. 1 has a longitudinal axis 32' around which is formed an inside cylindrical wall 34'. In transverse cross section perpendicular to the axis 32', the cylindrical wall 34' defines a circle of diameter $D_3'$ substantially equal to the diameter $D_1'$. A staging annulus 36' is defined on the housing 12' by a shoulder 37' in a plane perpendicular to the axis 32' and is bounded by an inside diameter $D_i'$ coincident with the edge of inside cylindrical wall 34' and an outside diameter $D_o'$ generally equal to the diameter $D_2'$. Accordingly, the staging annulus 36' corresponds in size to the imaginary annulus 30'. A pair of spline grooves 38' and 40' in the inside cylindrical wall 34' correspond in transverse cross section to the shape of the spline teeth 24' and 26' and intersect the staging annulus 36' at a pair of notches 42' and 44', respectively, angularly spaced to register with the teeth 24' and 26'. An inside centering guide or concentricity chamfer 46' on the housing 12' corresponding to the centering guide 46 on the hub 12 is defined by an inside frusto-conical shoulder 48' centered on the axis 32'. The inside centering guide has an inner circular edge 50' coincident with the outside diameter $D_o'$ of the staging annulus 36' and an outer circular edge 52' disposed longitudinally outboard of the staging annulus. The diameter of the outer circular edge 52' is larger than the diameter $D_2'$ of the imaginary circle 28' around the plate 10'.

In a preferred assembly sequence of the modified generic embodiment, the housing 12' is held stationary by a fixture, not shown, and the plate 10' is nominally centered on the axis 32' above the housing. The plate is then advanced to a staged position, not shown, relative to the housing 12' within the centering guide 46' wherein the spline teeth 24' and 26' rest on or abut the staging annulus 36'. During advancement of the plate to the staged position the centering guide 46' functions as a reaction member causing the plate 10' to translate perpendicular to the axis 32' such that in the staged position thereof the circular edge 20' on the plate is substantially precisely concentric with the inside cylindrical wall 34' on the housing. In addition, because the plane of the staging annulus is perpendicular to the axis 32' and the spline teeth 24' and 26' are symmetrically arrayed around the edge 20', the plate 10' automatically assumes a stable position on the staging annulus perpendicular to the axis 32'. Assembly is then completed by simple rotation of the plate 10' about the axis 32' until the spline teeth 24' and 26' register with the notches 42' and 44' whereupon the plate is advanced into the housing as the spline teeth traverse the spline grooves 38' and 40'. It is again understood, of course, that additional spline teeth and spline grooves might be employed and that the functional roles of the housing and the plate in the assembly sequence might be partially or completely reversed.

Figure 3:
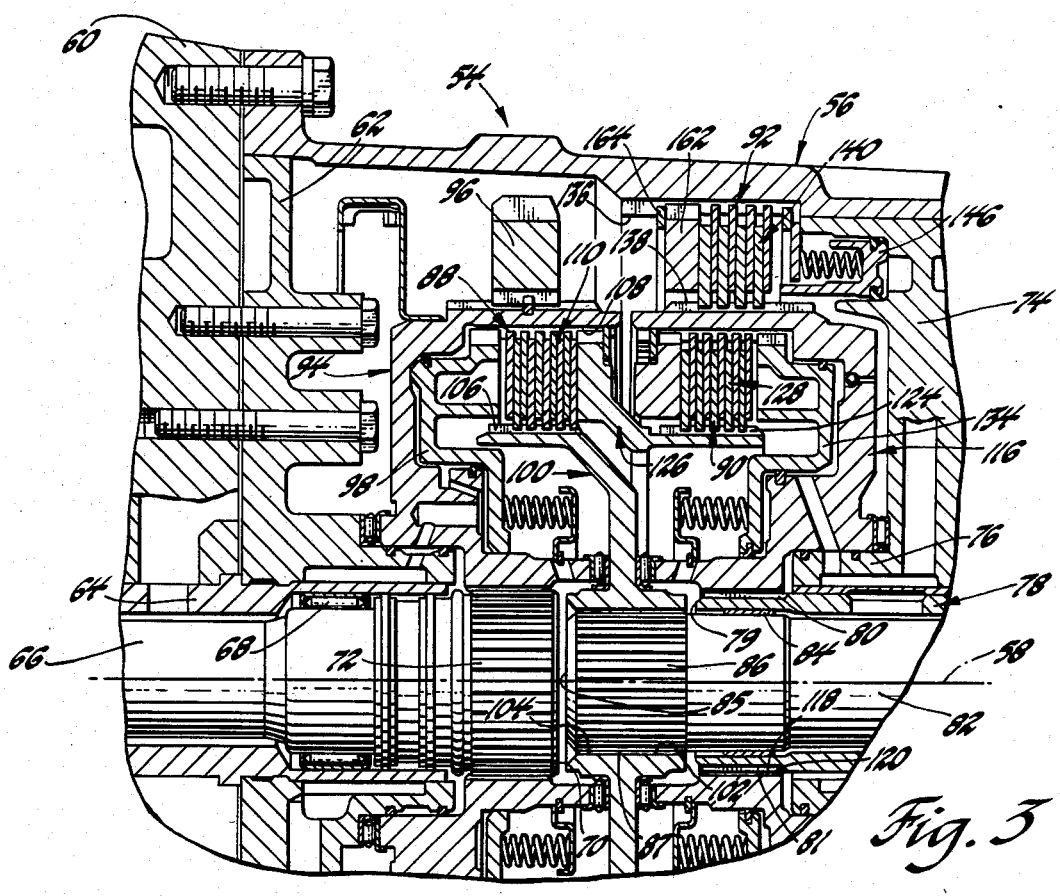
FIG. 3 is a fragmentary longitudinal section of an automotive automatic transmission embodying the assembly method and apparatus according to this invention.

Referring now to FIG. 3 and describing specific applications of the assembly method and apparatus according to this invention, a partially illustrated automotive automatic transmission 54 includes a generally cylindrical case 56 having a longitudinal axis 58. The transmission further includes a generally cylindrical torque converter housing 60 bolted to the left or forward end of the case 56 with a front support and valve assembly 62 bolted thereto within the case 56. A stator shaft 64 is aligned on the axis 58 and projects forward from the front support and valve assembly 62 into a torque converter, not shown, in the torque converter housing. A turbine shaft 66, drive connected to the torque converter turbine, is aligned on the axis 58 and rotatably supported within the stator shaft 64 on a bearing 68 with an inboard end 70 having a plurality of spline grooves 72 thereon projecting inward beyond the end of the stator shaft.

A generally disc shaped center support 74 of the transmission is rigidly connected to the case 56 and defines a partition therein. A boss 76 of the center support is aligned on the axis 58 and supports for rotation about the axis 58 a sleeve shaft 78 having a forward end 79 with a plurality of spline grooves 80 in an outside cylindrical wall 81 thereof projecting forward of the boss 76. A solid main shaft 82 is supported within the sleeve shaft for rotation about the axis 58 by a bearing 84. The main shaft has a forward end 85 with a plurality of spline grooves 86 in an outside cylindrical wall 87 thereof projecting beyond the end of the sleeve shaft. The shafts 78 and 82 are drive connected aft of the center support 74 to conventional planetary gear sets whereby various ratio drives are established.

Figure 4:
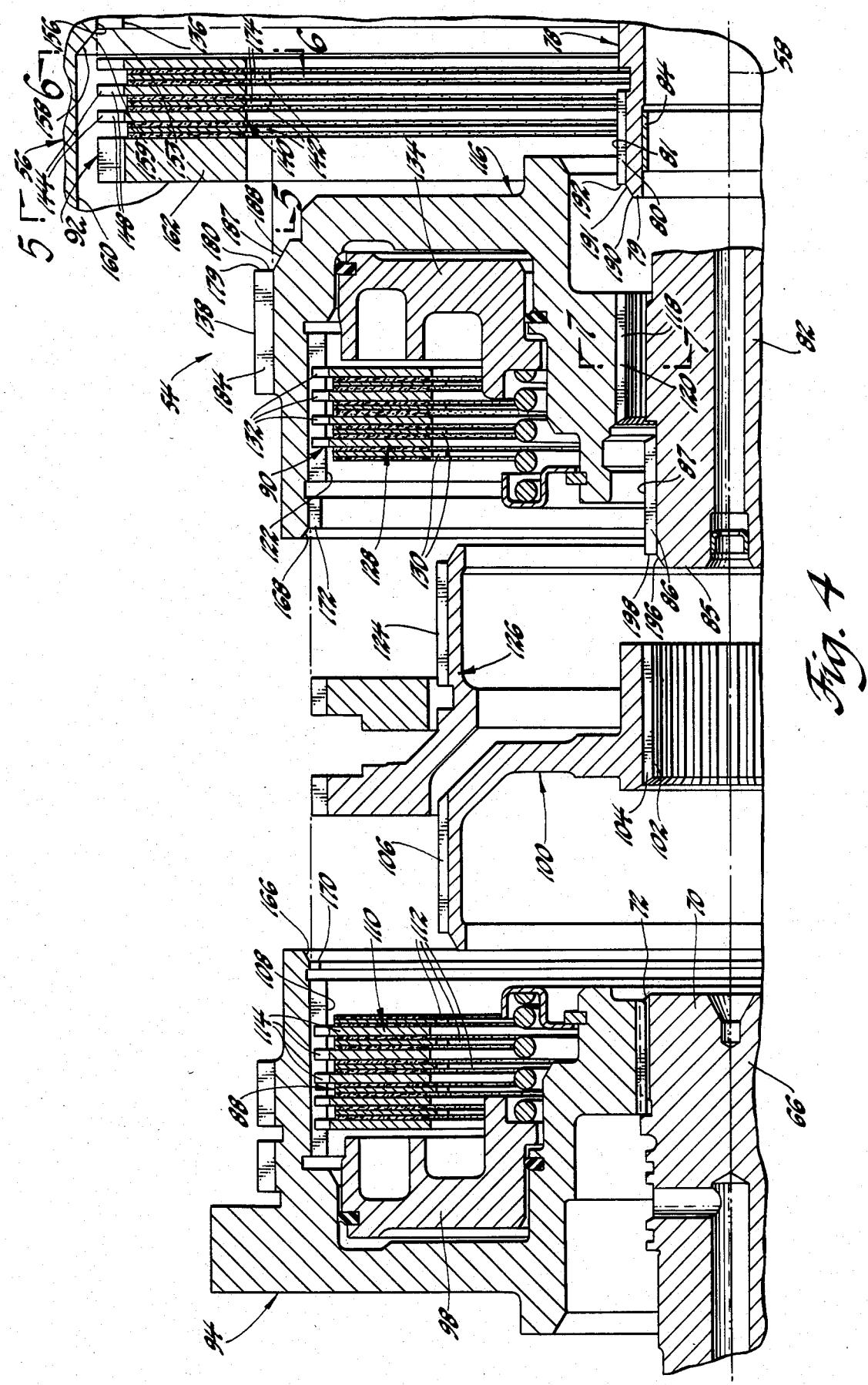
FIG. 4 is an enlarged, partially exploded view of a portion of FIG. 3.

As best seen in FIGS. 3 and 4, a pair of rotating clutches 88 and 90 and a nonrotating clutch 92 control power flow from the turbine shaft 66 to the sleeve shaft 78 and to the main shaft 82. Rotating clutch 88 includes a drum 94 press fitted on to the spline grooves 72 on the end of the turbine shaft 66 for rotation as a unit therewith. A power takeoff gear 96 is drive connected to the drum 94 and an annular piston 98 is slidably supported therewithin. The clutch 88 further includes a hub 100 having a center bore defining an inside cylindrical wall 102 in which are formed a plurality of spline grooves 104 slidably engageable with the spline grooves 86 on the main shaft 82. The hub 100 has an outside cylindrical wall 106 disposed within and concentric with an inside cylindrical wall 108 of the drum 94. A clutch pack 110, including a plurality of alternately spaced friction material lined inner annular plates 112 and unlined outer annular plates 114, is disposed between the inside and outside walls 108 and 106 and is compressed by the piston 98 whereby the turbine shaft 66 is selectively drive connected to the main shaft 82.

Similarly, the rotating clutch 90 includes a drum 116 having a center bore defining an inside cylindrical wall 118 in which are formed a plurality of spline grooves 120 slidably engageable with the spline grooves 80 in the sleeve shaft 78. An inside cylindrical wall 122 of the drum 116 surrounds and is concentric with an outside cylindrical wall 124 of a hub 126 of the clutch 90 which hub is drive connected to the drum 94 of clutch 88. A clutch pack 128, including a plurality of alternately spaced friction material lined inner annular plates 130 and unlined outer annular plates 132, is disposed between the inside and outside cylindrical walls 122 and 124 and is compressed by an annular piston 134 slidably supported on the drum 116 whereby the turbine shaft 66 is selectively drive connected to the sleeve shaft 78.

The stationary clutch 92 is disposed between the drum 116 of the rotating clutch 90 and the transmission case 56 and includes an inside cylindrical wall 136 formed on the transmission case 56 and a concentric outside cylindrical wall 138 on the drum 116. A clutch pack 140, including a plurality of alternately spaced friction material lined inner annular plates 142 and unlined outer annular plates 144, is disposed between the inside and outside cylindrical walls 136 and 138 and is compressed by an annular piston 146 on the center support 74 whereby the drum 116 and the sleeve shaft 78 are selectively braked.

In the overall transmission build-up sequence, the center support 74 and the planetary gearing aft thereof are installed on the transmission case 56 prior to the clutches 88, 90 and 92. Then, with the case 56 fixtured to orient axis 58 thereof vertically, the clutch pack 140 of the stationary clutch 92, the drum 116 with the clutch pack 128 thereon, and the subassembly consisting of the turbine shaft 66 and the drum 94 with the clutch pack 110 and the hubs 100 and 126 thereon, are installed in that order. Finally, the front support and valve assembly 62 and the torque converter housing 60 are attached to and close the upper or forward end of the case 56.

Assembly of the clutch packs 110, 128 and 140 on the drums 94 and 116 and on the case 56, respectively, are substantially identical applications of the assembly method and apparatus according to this invention corresponding to the modification of the generic embodiment illustrated in FIG. 2. More particularly, and referring to FIGS. 4 and 5 and describing in detail only assembly of the clutch pack 140 on the case 56 as representative of all three applications, each of the outer clutch plates 144 has an outer circular edge 147 from which a plurality of spline teeth 148 symmetrically arrayed around the edge 147 project radially outward to an imaginary circle 150. The spline teeth 148 are thus disposed in an imaginary annulus 151 corresponding to one half of the difference between the diameters of edge 147 and circle 150. A shoulder 152 on the case 56 in a plane perpendicular to the axis 58 defines a staging annulus 153 bounded by an inner diameter 154 coincident with the inside cylindrical wall 136 of the case and an outer diameter 155. The difference between the inner and outer diameters of the staging annulus corresponds to the difference between the diameters of circular edge 147 and circle 150 of the plate 144 so that the staging annulus 153 corresponds in size to the imaginary annulus 151. The case 56 further includes a plurality of spline grooves 156 in the inside wall 136 with cross sectional configurations corresponding to the shape of the spline teeth 148 on the plate 144 and intersecting the staging annulus 153 at a plurality of notches 157. A frusto-conical shoulder 158 on the case 56 defines an inside centering guide or concentricity chamfer 159 having an inside circular edge coincident with outer diameter 155 of the staging annulus 153 and an outside circular edge where the shoulder merges with an inner wall 160 of the case.

The diameter of the outside circular edge of the concentricity chamfer exceeds the diameter of the imaginary circle 150 of the outer clutch plate 144. With the center support 74 and shafts 78 and 82 installed on the case 56 and the latter fixtured such that the forward end thereof is up and the axis 58 vertical, the assembly of clutch pack 140 proceeds as follows. The longitudinally innermost one of the outer clutch plates 144 is nominally centered on the axis 58 and lowered into the inner wall 160 of the case and deposited in a staged position on the staging annulus 153 whereat it momentarily rests under its own weight due to non-registry between the spline teeth 148 and the notches 157. In the staged position, the plate 144 is perpendicular to axis 58 and the circular edge 147 thereof is substantially precisely concentric with inside cylindrical wall 136 of the case. The plate is then rotated on the staging annulus 153 about the axis 58 until the spline teeth 148 register with the notches 157 whereupon the plate descends along the inside wall 136 with the spline teeth traversing the spline grooves until the plate abuts the piston 146 on the center support. The adjacent one of the inner plates 142 is then placed on top of the outer plate 144 whereby it is maintained in a plane perpendicular to axis 58 but with freedom to both translate within inside wall 136 and rotate. The sequence is repeated until all of the inner and outer plates 142 and 144 of the clutch pack and a backing plate 162 similar to outer plates 144 are assembled on the case and retained thereon by a retaining ring 164, FIG. 3. As a matter of reference, in assembly of the clutch packs 110 and 128, a pair of inside centering guides or concentricity chamfers 166 and 168 and a pair of staging annuli 170 and 172 on the drums 94 and 116, respectively, function as described hereinbefore with respect to centering guide 159 and staging annulus 153 on the case 56.

The next step in the build-up of the transmission, assembly of the drum 116 on the clutch pack 140 and on the sleeve shaft 78, represents two further applications of the assembly method and apparatus according to this invention. In particular, assembly of the drum 116 on the clutch pack 140 is substantially identical to assembly of the hubs 100 and 126 on the clutch packs 110 and 128, respectively, and corresponds to the generic embodiment shown in FIG. 1. Assembly of the drum 116 on the sleeve shaft 78 is substantially identical to assembly of the hub 100 on the main shaft 82 and represents another modification of the generic embodiment shown in FIG. 1. Referring now to FIGS. 4 and 6 and describing in detail only the assembly of the drum 116 on the clutch pack 140 as representative of all three occurrences, each of the inner annular plates 142 of the clutch pack includes a plurality of spline teeth 174 symmetrically arrayed around and projecting radially inward from an inside circular edge 176 of the plate to an imaginary circle 177. The spline teeth 174 are thus disposed in an imaginary annulus 178 the radial depth of which corresponds to one half of the difference between the diameters of the circular edge 176 and the circle 177. Because the inner plates 142 are each free to translate within the confines of inner cylindrical wall 136 of the case and to rotate about their individual centers, as a general rule the spline teeth 174 of the plates 142 of the clutch pack are neither axially nor angularly aligned prior to assembly of the drum 116.

With continued reference to FIGS. 4 and 6, the drum 116 has formed thereon staging annulus 179 in the form of an annular shoulder 180 in a plane perpendicular to an axis of the drum coincident with axis 58 of the transmission and is bounded by an outside diameter 181 coincident with the outside cylindrical wall 138 and an inside diameter 182 generally equal to the diameter of the imaginary circle 177 of the inner plate 142. The staging annulus 179 thus corresponds in size to the imaginary annulus 178. A plurality of spline grooves 184 in the outside cylindrical wall 138 of the drum 116 have cross sectional configurations corresponding to the shape of the spline teeth 174 and intersect the staging annulus 179 at a plurality of notches 186. The notches 186 are angularly spaced around the staging annulus to register with the spline teeth 174. The drum 116 also has formed thereon an outside centering guide or concentricity chamfer 187 in the form of a frusto-conical shoulder 188 bounded by an outer circular edge coincident with the inside diameter 182 of the staging annulus and an inner circular edge 189. The diameter of the inner circular edge 189 is smaller than the diameter of the imaginary circle 177.

The drum 116 is positioned above the clutch pack 140 in nominal alignment on the axis 58 and then lowered to initiate contact between the uppermost one of the inner clutch plates 142 of the clutch pack and the centering guide 187 on the drum. Because of the substantial mass of the drum relative to the uppermost clutch plate, the drum functions as a reaction member whereby continued descent thereof causes the uppermost clutch plate 142 to translate laterally relative to the drum to a staged position wherein the spline teeth 174 abut the staging annulus 179. In the staged position, the drum 116 is rotated until registry is achieved between the spline teeth 174 and the notches 186 whereupon the drum 116 descends toward another staged position on the next succeeding one of the inner clutch plates 142. The drum 116 is staged and rotated relative to each succeeding inner clutch plate until the drum is fully installed on the clutch pack 140. If desired, of course, the drum 116 may be lowered into the clutch pack 140 by mechanical means, such as a robot, which is capable of easily aligning and maintaining the drum on the axis 58 while rotating the drum in each staged position to effect registry of the spline teeth 174 and the notches 186.

Referring now to FIGS. 4 and 7 and describing in detail the assembly of drum 116 on the sleeve shaft 78 as representative of both occurrences of this embodiment of the assembly method and apparatus according to this invention, the forward end 79 of the sleeve shaft 78 is shrouded by the drum as the latter is lowered into the clutch pack 140 so that the assembler may not be able to see the sleeve shaft. The spline grooves 120 in the inside cylindrical wall 118 of the drum correspond to the spline teeth 174 of the clutch plates 142 except for the length of the grooves 120 which substantially exceeds the thickness of the clutch plates. The drum 116 is, however, like the clutch plates in that it must also be perpendicular to axis 58 of the transmission and sleeve shaft with concentricity between inside cylindrical wall 118 of the hub and outside cylindrical wall 81 of the shaft. Accordingly, an outside centering guide or concentricity chamfer 190 in the form of a frusto-conical shoulder 191 is formed on the end 79 of the sleeve shaft and corresponds to the centering guide 187 on the drum 116. Likewise, a staging annulus 192 is defined on the sleeve shaft by a shoulder 193 in a plane perpendicular to the axis of the sleeve shaft and to axis 58 and corresponds to the staging annulus 179 on the drum 116. The spline grooves 80 in the sleeve shaft intersect the staging annulus 192 at a plurality of notches 194 corresponding to notches 186 on the drum 116.

As the drum 116 is lowered into the clutch pack 140 and the sleeve shaft 78 shrouded thereby, the outside centering guide 190 on the sleeve shaft engages the drum and functions as a reaction member to guide the drum to a staged position on the shaft wherein the drum rests on the staging annulus 192. If drum 116 achieves the staged position on the sleeve shaft 78 before it achieves the staged position on an inner clutch plate 142 of the clutch pack 140, then the sleeve shaft may function as a fixture whereby the drum is aligned on the axis 58. In the staged position on the sleeve shaft, the drum is rotated about the axis 58 until registry is achieved between the spline grooves 120 and the notches 194 on the sleeve shaft whereupon the drum is advanced longitudinally relative to the sleeve shaft until the spline grooves 120 fully overlap the spline grooves 80, FIG. 3. As a matter of reference, an outside centering guide or concentricity chamfer 196 and a staging annulus 198 on the main shaft 82 function during assembly of the hub 100 on the main shaft as described with respect to centering guide 190 and staging annulus 192 on the sleeve shaft 78.

The method and apparatus according to this invention is particularly suited for robotic assembly of clutches and clutch packs. For example, it has heretofore not been possible to economically adapt robots to assemble hubs and drums, such as drum 116, into clutch packs such as clutch pack 140, because of the randomness of the orientation of the inside plates. That is, while a robot can accurately align drum 116 on the axis 58 of the case, advance the same toward the clutch pack, and rotate the drum to attempt spline tooth and spline groove registry, it cannot easily adjust for lack of concentricity between the inner circular edges of the inside clutch plates and the outside cylindrical wall of the drum. However, with the addition to the drum of a centering guide or concentricity chamfer and a staging annulus, each of the succeeding inside clutch plates is automatically staged relative to the drum with the required concentricity so that simple rotation of the drum brings the spline teeth and spline grooves into registry.

The embodiments of the invention in which an exclusive property or privilege is claimed are defined as follows:

1. A method of assembling a spline connection between a first member and a second member comprising the steps of, forming on said first member a circular edge having a first diameter, forming on said first member at least two angularly spaced spline teeth projecting from said circular edge to a concentric imaginary circle having a second diameter so that each of said spline teeth is disposed in an imaginary annulus between said first and said second diameters, forming on said second member a cylindrical wall aligned on and parallel to an axis of said second member having a diameter generally equal to said first diameter, forming on said second member at an end of said cylindrical wall and in a plane perpendicular to said axis a staging annulus corresponding in size to said imaginary annulus with a first edge thereof coincident with an edge of said cylindrical wall, forming on said second member a centering guide shoulder extending longitudinally outboard from the plane of said staging annulus having one edge coincident with a second edge of said staging annulus, forming at least two spline grooves in said cylindrical wall intersecting said staging annulus at a corresponding number of notches angularly spaced to register with said spline teeth, advancing said first member to a staged position on said second member wherein said spline teeth abut said staging annulus and during which advancement one of said first and said second members forms a reaction member whereby said centering guide shoulder effects relative translation perpendicular to said axis between said first and said second members to establish concentricity between said circular edge on said first member and said cylindrical wall on said second member in said staged position, rotating said first member in said staged position to register each of said spline teeth with a corresponding one of said notches, and advancing said first member along said axis relative to said second member.

2. The method recited in claim 1 wherein said first member is an annular flat plate and said circular edge thereof is an outside edge, said cylindrical wall is an inside cylindrical wall of said second member and said centering guide shoulder is an inside frusto-conical shoulder.

3. The method recited in claim 1 wherein said first member is an annular flat plate and said circular edge thereof is an inside edge, said cylindrical wall is an outside cylindrical wall of said second member, and said centering guide shoulder is an outside frusto-conical shoulder.

4. The method recited in claim 2 wherein said second member is a clutch housing and said flat plate is an outer annular clutch plate.

5. The method recited in claim 3 wherein said second member is a clutch hub and said flat plate is an inner annular clutch plate.

6. In a clutch of the type having a first member and a second member defining concentric inside and outside cylindrical walls rotatable relative to each other about an axis of said clutch, a plurality of first annular clutch plates connected to one of said inside and said outside cylindrical walls and disposed in planes perpendicular to said axis, and a plurality of second annular clutch plates disposed between respective ones of said first clutch plates in planes perpendicular to said axis, a method of assembling the one of said first and said second members corresponding to the other of said inside and said outside cylindrical walls comprising the steps of, forming on each of said second clutch plates around a circular edge thereof a plurality of angularly spaced spline teeth disposed in an imaginary annulus concentric with said circular edge, forming on said one member at an end of said other cylindrical wall and in a plane perpendicular thereto a staging annulus corresponding in size to said imaginary annulus with a first edge coincident with said other cylindrical wall, forming on said one member a centering guide shoulder extending longitudinally outboard from the plane of said staging annulus having one edge coincident with a second edge of said staging annulus, forming a plurality of spline grooves in said other cylindrical wall corresponding in number to the number of said spline teeth and intersecting said staging annulus at a corresponding number of notches angularly spaced to register with said spline teeth, advancing said one member along said axis to a staged position on the outermost one of said second clutch plates wherein said staging annulus abuts said spline teeth during which advancement said one member forms a reaction member whereby said centering guide shoulder effects relative translation of said outermost second clutch plate to establish concentricity between said circular edge and said other cylindrical wall in said staged position, rotating said one member in said staged position to register each of said notches with a corresponding one of said spline teeth, and advancing said one member along said axis to successive staged positions on each succeeding one of said second clutch plates and rotating said one member in each of said successive staged positions to register said notches and said spline teeth.

7. The method recited in claim 6 wherein said other cylindrical wall is an outside cylindrical wall, said circular edge on each of said second clutch plates is an inner circular edge, and said centering guide shoulder is an outside frusto-conical shoulder on said one of said first and said second members.

8. The method recited in claim 6 wherein said other cylindrical wall is an inside cylindrical wall, said circular edge on each of said second clutch plates is an outer circular edge, and said centering guide shoulder is an inside frusto-conical shoulder on said one of said first and said second members.

9. In a clutch having a first member defining one of an inside cylindrical wall and an outside cylindrical wall aligned on an axis of said clutch, a plurality of first annular clutch plates connected to said one cylindrical wall and disposed in planes perpendicular to said axis, and a plurality of second annular clutch plates disposed between respective ones of said first clutch plates in planes perpendicular to said axis, the combination comprising, a second member defining the other of said inside and said outside cylindrical walls, means operative to support said second member relative to said first member such that said inside and said outside cylindrical walls are concentric and rotatable relative to each other about said axis, means on each of said second clutch plates defining a plurality of angularly spaced spline teeth projecting from a circular edge of said second clutch plate and disposed in an imaginary annulus concentric with said circular edge, means on said second member defining at one end of said other cylindrical wall and in a plane perpendicular thereto a staging annulus corresponding in size to said imaginary annulus with a first edge coincident with said other cylindrical wall, means on said second member defining a centering guide shoulder extending longitudinally outboard from the plane of said staging annulus having one edge coincident with a second edge of said staging annulus, and means on said second member defining a plurality of spline grooves in said other cylindrical wall intersecting said staging annulus at a corresponding plurality of notches angularly spaced to register with said spline teeth.

10. The combination recited in claim 9 wherein said other cylindrical wall is an outside cylindrical wall, said circular edge on each of said second clutch plates is an inner circular edge, and said centering guide shoulder is an outside frusto-conical shoulder on said second member.

11. The combination recited in claim 9 wherein said other cylindrical wall is an inside cylindrical wall, said circular edge on each of said second clutch plates is an outer circular edge, and said centering guide shoulder is an inside frusto-conical shoulder on said second member.

* * * * *